July 17, 1951          J. N. SHIVE          2,560,606
PHOTORESISTIVE TRANSLATING DEVICE
Filed April 6, 1949          3 Sheets-Sheet 1
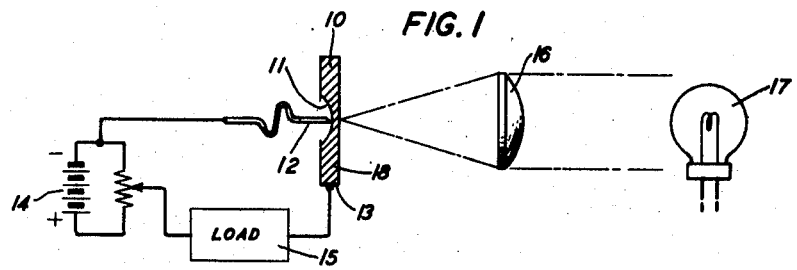
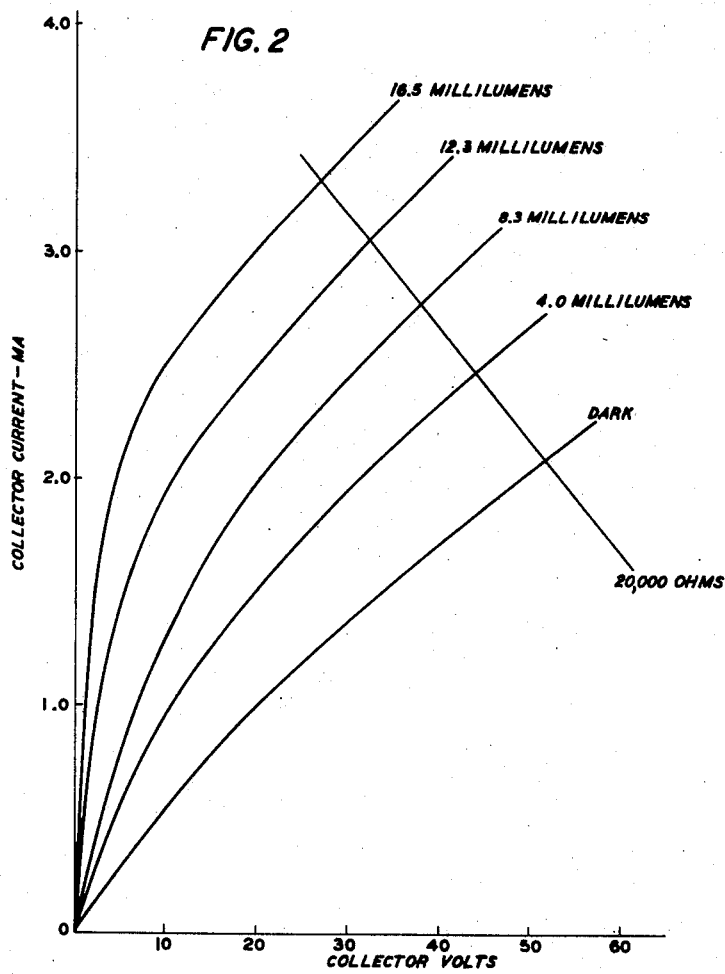
INVENTOR
J. N. SHIVE
BY
ATTORNEY July 17, 1951 J. N. SHIVE 2,560,606
PHOTORESISTIVE TRANSLATING DEVICE
Filed April 6, 1949 3 Sheets-Sheet 3
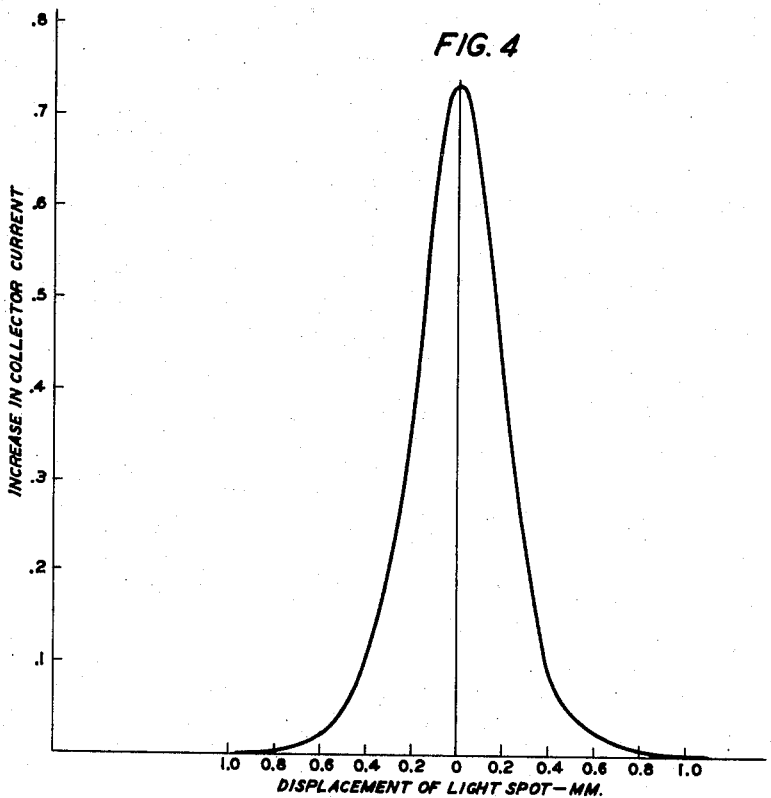
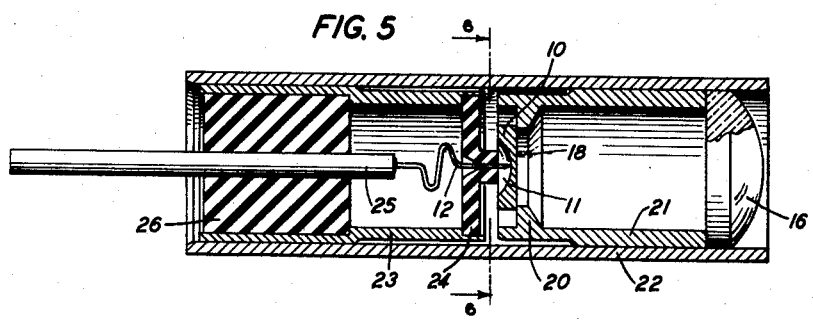
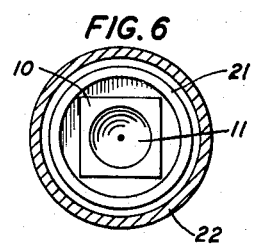
INVENTOR
J. N. SHIVE
BY
ATTORNEY Patented July 17, 1951

2,560,606

UNITED STATES PATENT OFFICE 2,560,606

PHOTORESISTIVE TRANSLATING DEVICE

John N. Shive, Plainfield, N. J., assignor to Bell Telephone Laboratories, Incorporated, New York, N. Y., a corporation of New York Application April 6, 1949, Serial No. 85,788

9 Claims. (Cl. 250—211)

This invention relates to light responsive electrical devices and more particularly to photoresistive signal translating devices including a body of semiconductive material.

One object of this invention is to improve the performance and structural characteristics of photoelectric devices and, more specifically, of photoresistive devices for controlling or modifying electrical signals in accordance with light. Light, as herein referred to, embraces both the visible and invisible portions of the photographic spectrum.

In one illustrative embodiment of this invention, a translating device comprises a body of germanium, for example of the high back voltage N conductivity type, having a portion between two opposed faces thereof reduced in thickness, for example of the order of 0.002 inch thick. The device comprises also a point contact bearing against one face of the thin portion of the germanium body, and an ohmic connection to the body at a region spaced from the point contact. A load circuit is connected between the contact and the ohmic connection and includes a source for biasing the contact in the reverse direction, i. e. the polarity corresponds to the high resistance direction of diode rectification of the semiconductor-metal contact combination. Light, which may be variable in intensity or frequency of application or both, is focussed upon a restricted area of the thin portion of the germanium body opposite the point contact.

The device exhibits very high sensitivity, for example of the order of several hundred milliwatts per lumen, high resolution, the active area in typical devices being but a few hundredths square millimeter, and high efficiency, specifically a quantum efficiency greater than unity. Furthermore, it is responsive over a wide range of wavelengths in the light spectrum including those most prevalent, on a quantum distribution basis, in the spectrum of a black body radiator, and the change in load current as a function of variation in intensity of illumination is essentially linear. Additionally, the device is characterized structurally by light weight, small size, simplicity and ruggedness and, thus, is susceptible of expeditious manufacture in quantity and has inherently a long operating life.

In addition, in operation, the device produces a current multiplication whereby it functions simultaneously as a photocell and an amplifier.

Although germanium has been noted specifically hereinabove, the invention may be embodied in devices utilizing other semiconductive materials, for example silicon, capable of producing a transmitted photo effect, that is the production of electrical changes in regions of a crystal by illumination of a region of the crystal remote from these regions. Also, although N-type material has been mentioned specifically hereinabove, P-type material also may be used.

The invention and the various features thereof will be understood more clearly and fully from the following detailed description with reference to the accompanying drawing in which:

Fig. 1 is a diagram illustrating the principal components of a photoelectric translating device constructed in accordance with this invention;

Figs. 2 and 3 are graphs indicating the operating characteristics of typical devices illustrative of this invention;

Fig. 4 is another graph indicating the resolving power of such devices;

Figs. 5 and 6 are longitudinal and transverse sectional views respectively of a translating device illustrative of one embodiment of this invention.

Figure 3:
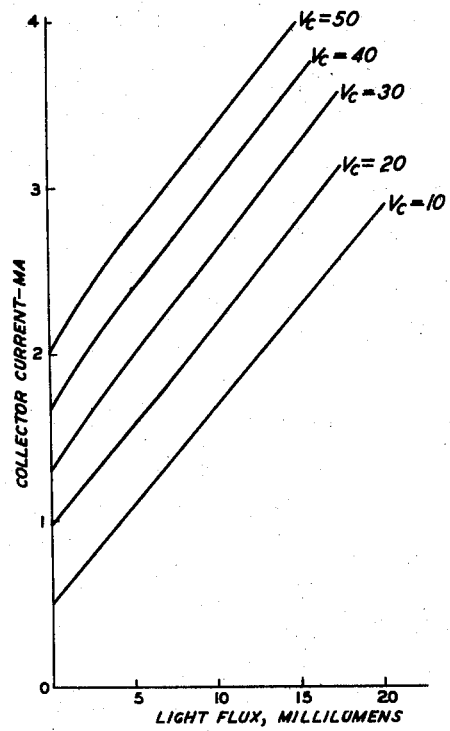

Referring now to the drawing, the apparatus illustrated in Fig. 1 comprises a disc or wafer 10 of germanium having in one face thereof a central spherical depression 11, and a point contact 12, hereinafter referred to as the collector, bearing against the center of the depressed surface. The disc or wafer 10 may be of high back voltage N-type germanium produced, for example, as disclosed in the application, Serial No. 638,351, filed December 29, 1945, of J. H. Scaff and H. C. Theuerer and having its surfaces etched as disclosed in that application and Serial No. 44,241, filed August 14, 1948 of J. N. Shive. Advantageously, the unit may be given an electrical-forming treatment similar to that described in the Shive application. In a specific and illustrative device, the treated and formed wafer may be 0.10 inch in diameter, have an overall thickness of 0.020 inch and a minimum thickness, at the point contact region, of 0.002 inch. An ohmic connection 13, hereinafter referred to as the base, is made to the peripheral surface of the disc. Such connection may be, for example, a rhodium coating electroplated upon this surface, or a cured silver paste.

The collector 12 is biased negatively with respect to the base 13 by a source 14, a load 15 being included in the circuit as shown. It will be noted that the polarity of bias corresponds to the blocking direction of rectification of the metal contact 12 to N-type germanium wafer combination. For a device of the construction above noted, the bias may be of the order of 20–100 volts and the load resistance may be of the order of 10,000 to 25,000 ohms.

Opposite the disc or wafer 10 is a lens 16 for concentrating light from a source 17 upon a restricted region of the face 18 axially opposite the collector 12. The source 17 may be, for example, a tungsten filament operated at about 2900 degrees absolute. Suitable means may be provided for varying the intensity of, or periodically interrupting, the illumination of the face 18 by the light source.

Typical operating characteristics of devices of the construction illustrated in Fig. 1 and above described are depicted graphically in Figs. 2 and 3. For the cases represented, the image, upon the face 18, of the source 17, was substantially 0.005 inch in diameter. Fig. 2 shows the collector current-collector voltage relationships for several values of total light flux from the source 17 incident upon the face 18 of the semi-conductive disc, the light flux being constant for each curve and varied for the cases of the several curves by inserting light absorbing screens, without changing the color of the light, between the source and the face 18. The matching load line at 20,000 ohms is indicated. Fig. 3 presents a family of curves showing the collector current-incident light flux relation for several values of collector voltage. In interpreting the curves of Figs. 2 and 3, it may be borne in mind that the illumination indicated is of the visible components of tungsten light as measured in lumens and that the response is the measured total response to the entire useful continuous spectral distribution of tungsten light.

Particularly to be noted from the characteristics as presented in Figs. 2 and 3 is the exceptionally large direct-current response of the devices, e. g. of the order of 100,000 microamperes per lumen at a load of 20,000 ohms. Calculations based on Fig. 2 indicate that the useful alternating-current power response obtainable from the device by mechanically chopping the light beam is of the order of 600 milliwatts per lumen at low intensity illuminations.

The resolving power in space of devices constructed in accordance with this invention is illustrated in Fig. 4, which is based on measurements of a unit of the construction described above operated with a load of 10,000 ohms and with the collector biased 70 volts negative. The curve portrays the change in collector current as a function of displacement of a spot of light of 0.20 millimeter diameter upon the face 18, the zero abscissae point being that for the light spot centered on the face 18, opposite the collector point 12. It will be noted that the width of the curve at half maximum is 0.40 millimeter. By substracting from this the diameter of the light spot, the resolving power of the device is indicated as 0.20 millimeter. It appears, then, that the active area of the surface 18, that is the area over which incident light is effective in substantially altering the collector current, is of the order of a few hundredths square millimeter immediately opposite the collector.

Two other significant characteristics of the device merit note. It has been determined that the response of the device, as a function of the wavelength of the incident light, rises slowly from wavelengths in the visible yellow region of the spectrum to a maximum at wavelengths of about 1.5 microns and then falls off rapidly at wavelengths beyond 1.6 microns, as illustrated graphically in Fig. 7. The range of wavelengths to which the device is responsive is quite broad. In addition the range of high spectral sensitivity of the device includes the wavelengths for which the quantum emission from the usual black body radiation sources is relatively high.

Furthermore, the frequency response range of devices constructed in accordance with this invention is quite wide, extending from zero to the megacycle region.

The following explanation of the operation of the device is consistent with the results actually obtained. The absorption of light by germanium results in the production of free electron-hole pairs. If these pairs are produced in the immediate vicinity of the collector where the electric field in the germanium is high, the charge is separated and collected before recombination of holes and electrons can occur. Thus, an increment of collector current is produced. However, when light is absorbed in portions of the germanium remote from the collector, the electrons and holes liberated recombine and no externally observable electrical effects occur. The magnitude of the collector current modification is dependent upon the energy of the incident light.

Figure 7:
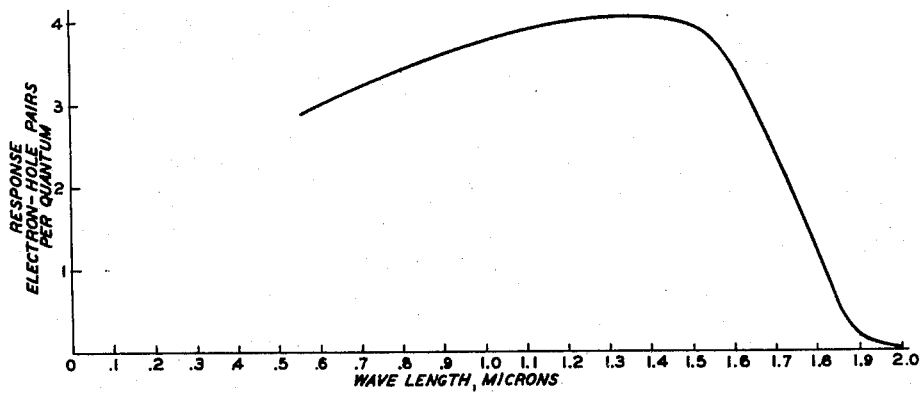
Fig. 7 is a graph illustrating the response, as a function of wavelength of incident light, in a device typical of and constructed in accordance with this invention.

Measurements of the spectral response on a quantum yield basis of typical devices constructed in accordance with this invention have shown that over wide ranges of wavelengths each quantum of radiation incident upon the active area results in the collection of several electronic charges in the external circuit. The charge yield per quantum as a function of wavelength is indicated in Fig. 7, referred to hereinabove. Such yields appear to be the result of two separate processes, namely, the primary absorption process in which not more than one electron-hole pair is produced per quantum and a current multiplication process by which this primary charge is multiplied in the high electric field extant near the collector. Thus, the device functions simultaneously as a photocell and as a current amplifier.

A specific device constructed in accordance with this invention is illustrated in Figs. 5 and 6 and comprises a square germanium wafer 10 of the dimensions given hereinabove, affixed, as by solder, to a flange 20 on a cylindrical metallic support 21 which is fitted and held within a metallic casing 22. Also fitted and held within the casing 22 is a metallic sleeve or support 23 carrying an insulating disc 24 which functions as a guide to center the contact 12, for example, of phosphor bronze, in the recess 11 in the wafer 10. The contact 12 is mounted by a rigid leading-in conductor 25 coaxial with the wafer and the casing and carried by an insulating block 26 fitted to the sleeve 23. The concentrating lens 16 for focusing light upon the central region of the face 18, opposite the collector 12, also is fitted within the casing 22 and is held therein, as by a suitable cement.

Although a specific embodiment of this invention has been shown and described, it will be understood that it is but illustrative and that various modifications may be made therein without departing from the scope and spirit of this invention. For example, although in the specific embodiment shown a single collector is utilized, a plurality of spaced collectors may be employed and the concentrated light beam directed against the active regions or areas of the face 18 opposite or corresponding to the respective collectors. These areas may be illuminated individually, for example in any prescribed sequence, thereby to effect a switching control or action.

What is claimed is:

1. A photoelectric translating device comprising a body of semiconductive material, said body having a thin portion between two opposite faces thereof, a point contact engaging one face of said body at said thin portion, an ohmic connection to said body at a region spaced from said contact, and means for directing a ray of energy against a region of the other face of said body opposite said contact.

2. A photoelectric translating device in accordance with claim 1 wherein said body is of germanium.

3. A photoelectric translating device in accordance with claim 1 wherein said body is of N conductivity type high back voltage germanium.

4. A photoelectric translating device comprising a wafer of semiconductive material, a rectifying connection to one face of said material, means for directing a concentrated beam of light upon a region of the opposite face of said wafer opposite said rectifying connection, an electrical connection to said body at a region spaced from said rectifying connection, and a load circuit coupled between said connections and including means for biasing said rectifying connection in the reverse direction.

5. A photoelectric translating device comprising a wafer of germanium, a point contact bearing against one face of said wafer, means for directing a concentrated beam of light upon a region of the opposite face of said wafer opposite said contact, an ohmic connection to said wafer at a region spaced from said point contact, and a load circuit connected between said contact and said connection and including means for biasing said contact in the reverse direction.

6. A photoelectric translating device comprising a body of N conductivity type germanium having a thin portion between two opposite faces thereof, a collector connection to said body at one face of said thin portion, means for directing light against a restricted area, opposite said collector connection, on the other face of said body, an ohmic connection to said body at a region thereof remote from said collector connection, and a load circuit between said collector and ohmic connections and including means for biasing said collector connection negative with respect to said region.

7. A photoelectric translating device comprising a wafer of semiconductive material having a portion between two opposite faces thereof of the order of 0.002 inch thick, a point contact engaging one face of said portion, means for directing a ray of energy of the order of 0.005 inch in diameter against the region on the other face of said portion opposite said contact, and an ohmic connection to said wafer at a region remote from said portion.

8. A photoelectric translating device comprising a wafer of N-type germanium having in one face thereof a recess, the base of which is of the order of 0.002 inch from the opposite face of said wafer, an ohmic connection to said wafer at a region spaced from said recess, a point contact bearing against the base of said recess, and means for directing a ray of light against the region of said opposite face opposite said point contact.

9. A photoelectric translating device comprising a casing, a metallic support within said casing and extending transversely thereof, a wafer of semiconductive material mounted by said support and having one face exposed to one end of said casing, said wafer being electrically connected adjacent its periphery to said support, the other face of said wafer having a recess therein, a point contact extending within said recess and bearing against the base thereof, a guide for said contact within said casing, and an optical concentrating lens at said one end of said casing and having its focus upon said one face of said wafer.

JOHN N. SHIVE.

REFERENCES CITED

The following references are of record in the file of this patent:

UNITED STATES PATENTS

| Number | Name | Date |
|---|---|---|
| 1,563,557 | Coblentz | Dec. 1, 1925 |
| 2,160,383 | Kannenberg | May 30, 1939 |
| 2,402,662 | Ohl | June 25, 1946 |